(12) United States Patent
Visbal Mendoza et al.

(10) Patent No.: US 12,731,780 B2
(45) **Date of Patent: *Sep. 8, 2026**

(54) ELECTRODE AND ALL-SOLID-STATE BATTERY

(71) Applicant: TOYOTA JIDOSHA KABUSHIKI KAISHA, Toyota (JP)

(72) Inventors: Heidy Hodex Visbal Mendoza, Nagoya (JP); Masaru Kubota, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 655 days.

This patent is subject to a terminal disclaimer.

(21) Appl. No.: 18/131,948

(22) Filed: Apr. 7, 2023

(65) Prior Publication Data

US 2024/0021868 A1 Jan. 18, 2024

(30) Foreign Application Priority Data

Apr. 15, 2022 (JP) ................................ 2022-067720

(51) Int. Cl.
*H01M 10/0562* (2010.01)
*H01M 4/36* (2006.01)
*H01M 10/052* (2010.01)

(52) U.S. Cl.
CPC .......... *H01M 4/362* (2013.01); *H01M 4/366* (2013.01); *H01M 10/052* (2013.01); *H01M 10/0562* (2013.01); *H01M 2300/0068* (2013.01)

(58) Field of Classification Search
CPC ......................... H01M 4/362; H01M 10/0562
See application file for complete search history.

(56) References Cited

U.S. PATENT DOCUMENTS 11,791,497 B2 * 10/2023 Yoshida ............ H01M 10/0525 429/304
2009/0081554 A1 3/2009 Takada et al.
(Continued)

FOREIGN PATENT DOCUMENTS

CN 109638282 A * 4/2019 .......... H01M 4/5825
JP 2010-135090 A 6/2010
(Continued)

OTHER PUBLICATIONS

Machine translation of JP 2015-07772 (no date) (Year: 0000).*
1 Non-Final Office Action dated Nov. 19, 2025, issued to U.S. Appl. No. 18/131,950 (18 pages).

*Primary Examiner* — Amanda C. Walke
(74) *Attorney, Agent, or Firm* — Dinsmore & Shohl LLP

(57) ABSTRACT

An electrode comprises a sulfide-based solid electrolyte and a composite particle. The sulfide-based solid electrolyte includes S and P, has a $PS_4$ crystalline phase, and has a molar ratio of the $PS_4$ crystalline phase to a total amount of phases consisting of P and S of 60% or more. The composite particle comprises a positive electrode active material particle and a coating film covering at least part of a surface of the positive electrode active material particle. The coating film includes a phosphorus compound. The phosphorus compound includes at least one of a first element (a glass network forming element) and a second element (a transition element) as well as phosphorus. In the coating film, a relationship of "expression (1): $C_{Li}/(C_P+C_{E1}+C_{E2})\leq 2.5$" is satisfied. $C_{Li}$, $C_P$, $C_{E1}$, and $C_{E2}$ represent element concentrations of respective elements measured by XPS.

6 Claims, 1 Drawing Sheet

(56) References Cited

U.S. PATENT DOCUMENTS

2012/0052396 A1 3/2012 Tsuchida et al.
2019/0181432 A1* 6/2019 Yui .................. H01M 10/0585
2019/0372102 A1 12/2019 Miki
2021/0005888 A1* 1/2021 Sugiura .................. H01M 4/62
2023/0299292 A1* 9/2023 Kubota ................. H01M 4/525
2023/0343961 A1* 10/2023 Watanabe ........... H01M 10/052
2023/0420735 A1* 12/2023 Yoshida ................ H01M 4/525

FOREIGN PATENT DOCUMENTS

JP 2012-099323 A 5/2012
JP 4982866 B 7/2012
JP 2015072772 A * 4/2015 ............ H01M 4/366

* cited by examiner

ELECTRODE AND ALL-SOLID-STATE BATTERY

CROSS REFERENCE TO RELATED APPLICATIONS

This nonprovisional application claims priority to Japanese Patent Application No. 2022-067720 filed on Apr. 15, 2022, with the Japan Patent Office, the entire contents of which are hereby incorporated by reference.

BACKGROUND

Field

The present disclosure relates to an electrode and an all-solid-state battery.

Description of the Background Art

Japanese Patent No. 4982866 discloses a technique that involves, in an all-solid-state lithium battery (a sulfide-based all-solid-state battery) including a lithium-ion-conductive solid electrolyte (a sulfide-based solid electrolyte), covering the surface of a positive electrode active material with a lithium-ion-conductive oxide and, thereby, making the lithium-ion-conductive oxide be present between the positive electrode active material and the sulfide-based solid electrolyte, and, as a result, inhibiting the formation of a high-resistance layer at the interface of contact between the sulfide-based solid electrolyte and the positive electrode active material at a high potential.

SUMMARY

A sulfide-based all-solid-state battery (which may also be simply called "an all-solid-state battery" hereinafter) includes a sulfide-based solid electrolyte. When the sulfide-based solid electrolyte comes into direct contact with a positive electrode active material particle and/or the like, the sulfide-based solid electrolyte may degrade. When the sulfide-based solid electrolyte (an ion conduction path) degrades, battery resistance may increase. To address this problem, forming a coating film on a surface of the positive electrode active material particle is suggested. The coating film inhibits direct contact between the positive electrode active material particle and the sulfide-based solid electrolyte, and thereby degradation of the sulfide-based solid electrolyte may be reduced.

Conventionally, as a material of the coating film, $LiNbO_3$ and $Li_3PO_4$ are known, for example. The resistance of $LiNbO_3$ may be lower than that of $Li_3PO_4$. Because of this, use of $LiNbO_3$ has been increasing. However, according to a new finding by the inventors of the present disclosure, in terms of high-voltage endurance, phosphorus compounds such as $Li_3PO_4$ are superior to $LiNbO_3$. The inventors of the present disclosure also have found that a phosphorus-based coating film including a particular phosphorus compound has a low resistance.

However, the inventors of the present disclosure have also found that, in an electrode that includes both an active material covered with the phosphorus-based coating film and a sulfide-based solid electrolyte (and also in a battery comprising such an electrode), resistance can increase after cycle testing and in some other instances.

An object of the present disclosure is to inhibit an over-time increase of resistance in an electrode including a sulfide-based solid electrolyte and a composite particle comprising a phosphorus-based coating film (a covered active material).

[1] An electrode comprising:

a sulfide-based solid electrolyte; and a composite particle, wherein the sulfide-based solid electrolyte includes S and P, has a $PS_4$ crystalline phase, and has a molar ratio of the $PS_4$ crystalline phase to a total amount of phases consisting of P and S of 60% or more, the composite particle comprises an active material particle and a coating film covering at least part of a surface of the active material particle, the coating film includes a phosphorus compound, the phosphorus compound includes at least one of a first element and a second element as well as phosphorus, the first element is a glass network forming element, the second element is a transition element, and in the coating film, a relationship of the following expression (1) is satisfied:

$$C_{Li}/(C_P+C_{E1}+C_{E2})\leq 2.5 \quad (1)$$

where each of $C_{Li}$, $C_P$, $C_{E1}$, and $C_{E2}$ represents an element concentration measured by X-ray photoelectron spectrometry, $C_{Li}$ represents an element concentration of lithium, $C_P$ represents an element concentration of phosphorus, $C_{E1}$ represents an element concentration of the first element, and $C_{E2}$ represents an element concentration of the second element.

The electrode according to [1] above makes it possible to inhibit an over-time increase of resistance in the electrode including the sulfide-based solid electrolyte and the composite particle comprising the phosphorus-based coating film (a covered active material).

A possible reason is as follows. When a phosphorus-based coating film (which is a relatively hard material) is used and, thereby, solid electrolyte (SE) is relatively soft as compared to the coating film in an electrode, this mismatching hardness between them, among others, causes a poor contact at the interface between the coating film of the covered active material and the solid electrolyte (namely, a low bonding strength), potentially leading to an increased resistance at the interface after cycle testing and in some other instances. On the other hand, in the electrode according to [1] above, a highly crystalline (which means having a high ratio of $PS_4$ crystalline phase) solid electrolyte, namely a hard solid electrolyte, is used as the solid electrolyte (sulfide SE), thereby the hardness of the coating film of the covered active material matches the hardness of the solid electrolyte, and, as a consequence, thanks to the anchoring effect and/or the like, the contact at the interface between them may be improved (the bonding strength may be increased), resulting in inhibited over-time increase of resistance.

[2] The electrode according to [1], wherein the first element is at least one selected from the group consisting of boron, silicon, nitrogen, sulfur, germanium, and hydrogen.

[3] The electrode according to [1] or [2], wherein the second element is at least one selected from the group consisting of a second transition element and a third transition element.

[4] The electrode according to any one of [1] to [3], wherein the sulfide-based solid electrolyte further includes Li.

[5] The electrode according to any one of [1] to [4], wherein the active material particle is a positive electrode active material particle, and the electrode is a positive electrode.

[6] An all-solid-state battery comprising the electrode according to any one of [1] to [5].

The foregoing and other objects, features, aspects and advantages of the present disclosure will become more apparent from the following detailed description of the present disclosure when taken in conjunction with the accompanying drawings.

DETAILED DESCRIPTION

Figure 1:
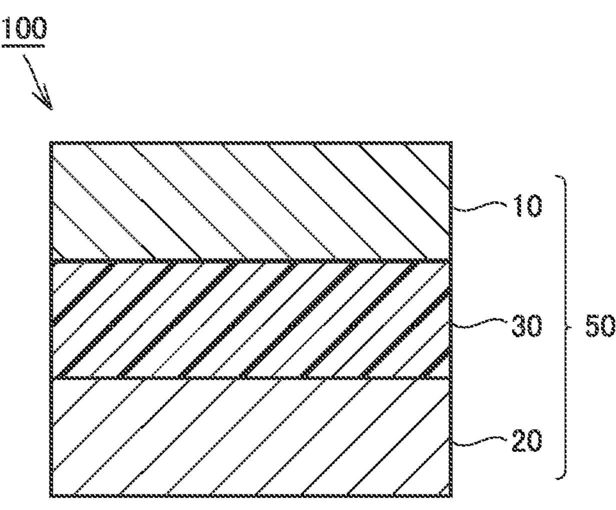
FIG. 1 is a conceptual view of an all-solid-state battery according to the present embodiment.

Next, an embodiment of the present disclosure (which may also be simply called "the present embodiment" hereinafter) and an example of the present disclosure (which may also be simply called "the present example" hereinafter) will be described. It should be noted that neither the present embodiment nor the present example limits the technical scope of the present disclosure.

Herein, a singular form also includes its plural meaning, unless otherwise specified. For example, "a particle" may mean not only "one particle" but also "a group of particles (powder, particles)".

When a compound is represented by a stoichiometric composition formula (such as "$LiCoO_2$", for example), this stoichiometric composition formula is merely a typical example of the compound. The compound may have a non-stoichiometric composition. For example, when lithium cobalt oxide is represented as "$LiCoO_2$", the composition ratio of lithium cobalt oxide is not limited to "Li/Co/O=1/1/2" but Li, Co, and O may be included in any composition ratio, unless otherwise specified. Further, doping with a trace element and/or substitution may also be tolerated.

<Electrode>

An electrode according to the present embodiment comprises a sulfide-based solid electrolyte and a composite particle. The electrode may be either a positive electrode or a negative electrode.

(Sulfide-Based Solid Electrolyte)

The sulfide-based solid electrolyte may form an ion conduction path in an active material layer. The sulfide-based solid electrolyte includes S and P. The sulfide-based solid electrolyte may further include Li. The sulfide-based solid electrolyte may further include O, Si, and/or the like, for example. The sulfide-based solid electrolyte may further include a halogen such as iodine (I), bromine (Br), and/or the like, for example.

In some embodiments, the molar ratio of a $PS_4$ crystalline phase (a structural unit) in the sulfide-based solid electrolyte (the molar ratio relative to the total amount of phases consisting of P and S (structural units), the degree of crystallinity) is 60% or more, 70% or more, or 80% or more.

The sulfide-based solid electrolyte may be of argyrodite type, perovskite type, and/or the like, for example, and, when the ratio of the $PS_4$ crystalline phase (a structural unit) satisfies the conditions described above, it may be of glass ceramic type.

In some embodiments, the sulfide-based solid electrolyte is of argyrodite type.

The sulfide-based solid electrolyte may include, for example, at least one selected from the group consisting of LiI—LiBr—$Li_3PS_4$, $Li_2S$—$SiS_2$, LiI—$Li_2S$—$SiS_2$, LiI—$Li_2S$—$P_2S_5$, LiI—$Li_2O$—$Li_2S$—$P_2S_5$, LiI—$Li_2S$—$P_2O_5$, LiI—$Li_3PO_4$—$P_2S_5$, $Li_2S$—$P_2S_5$, $Li_3PS_4$, LiCl—LiBr—$Li_3PS_4$, LiCl—LiBr—$Li_2S$—$P_2S_5$, and LiCl—LiBr—$Li_2S$—$SiS_2$.

For example, "LiI—LiBr—$Li_3PS_4$" refers to a sulfide-based solid electrolyte produced by mixing LiI, LiBr, and $Li_3PS_4$ in any molar ratio. For example, the sulfide-based solid electrolyte may be produced by a mechanochemical method. "$Li_2S$—$P_2S_5$" includes $Li_3PS_4$. $Li_3PS_4$ may be produced by, for example, mixing $Li_2S$ and $P_2S_5$ in "$Li_2S/P_2S_5$=75/25 (molar ratio)".

For example, the amount of the sulfide-based solid electrolyte to be used in the electrode may be from 1 to 200 parts by volume, or may be from 50 to 150 parts by volume, or may be from 40 to 85 parts by volume, relative to 100 parts by volume of the composite particle (a covered active material).

(Composite Particle)

The composite particle comprises an active material particle and a coating film. The composite particle may be called "a covered active material" and/or the like, for example.

The composite particle may form an aggregate, for example. More specifically, a single composite particle may include two or more active material particles. The composite particle may have a D50 from 1 to 50 μm, or may have a D50 from 1 to 20 μm, or may have a D50 from 5 to 15 μm, for example.

Herein, "D50" refers to a particle size in volume-based particle size distribution at which the cumulative frequency accumulated from the side of small particle sizes reaches 50%. D50 may be measured by laser diffraction.

<<Coating Film>>

The coating film covers at least part of a surface of the active material particle. The coating film is the shell for the composite particle.

The coating film includes a phosphorus compound.

(Phosphorus Compound)

The phosphorus compound includes at least one of a first element (E1) and a second element (E2) as well as P. Herein, the first element may also be abbreviated as "E1", and the second element may also be abbreviated as "E2".

The first element (E1) is an element capable of forming glass (a glass network forming element), more specifically, it is an element that can bind to O to form an oxide glass having a network structure. Adding E1 is expected to achieve mixed anion effect.

For example, E1 is at least one selected from the group consisting of boron (B), silicon (Si), nitrogen (N), sulfur (S), germanium (Ge), and hydrogen (H). For example, E1 is at least one selected from the group consisting of B and Si. E1 may form an oxide glass by itself. E1 may form a composite oxide glass with P.

The second element (E2) is a transition element. A "transition element" is an element belonging to Group 3 to Group 11 in the periodic table.

E2 has an ionic radius that is larger than that of P. E2 may inhibit crystallization of the phosphorus compound. For example, E2 is at least one selected from the group consisting of a first transition element (a 3d transition element), a second transition element (a 4d transition element), a third transition element (5d, 4f transition elements), and a fourth transition element. For example, E2 is at least one selected from the group consisting of the second transition element and the third transition element. The third transition element includes lanthanoid. That is, E2 may include lanthanoid, for example.

For example, E2 is at least one selected from the group consisting of lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), scandium (Sc), copper (Cu), yttrium (Y), zirconium (Zr), molybdenum (Mo), technetium (Tc), ruthenium (Ru), rhodium (Rh), palladium (Pd), silver (Ag), hafnium (Hf), tantalum (Ta), tungsten (W), rhenium (Re), osmium (Os), iridium (Ir), platinum (Pt), and gold (Au).

For example, E2 is at least one selected from the group consisting of La, Ce, Zr, and Y. For example, E2 is at least one selected from the group consisting of La, Ce, and Y.

The ratio of P in the phosphorus compound (or in the composite particle) is, for example, from 1 to 10 mass % relative to the total amount of the composite particle.

The phosphorus compound may further include Li, O, carbon (C), and/or the like, for example.

The phosphorus compound may include a phosphoric acid structure, for example. That is, the phosphorus compound may be a phosphoric acid compound. When the phosphorus compound includes a phosphoric acid structure, analysis of the composite particle by TOF-SIMS (Time-of-Flight Secondary Ion Mass Spectrometry) and/or the like may detect a fragment such as $PO_2^-$ and/or $PO_3^-$.

In the coating film (or in the phosphorus compound), the Li composition ratio "$C_{Li}/(C_P+C_{E1}+C_{E2})$" is 2.5 or less [see the above expression (1)]. When the Li composition ratio is 2.5 or less and at least one of E1 and E2 is present, battery resistance may be reduced significantly.

For example, the Li composition ratio described above may be 2.38 or less, or may be 2.26 or less, or may be 2.18 or less, or may be 2.03 or less, or may be 1.89 or less, or may be 1.73 or less, or may be 1.42 or less, or may be 1.1 or less. For example, the Li composition ratio may be 0.1 or more, or may be 0.5 or more, or may be 1.05 or more. For example, the Li composition ratio may be from 1.05 to 2.38.

The Li composition ratio may be zero. That is, Li may not be present on the surface of the coating film (the composite particle), or the coating film (or the phosphorus compound) may not include Li at all.

(XPS Measurement of Li Composition Ratio)

The Li composition ratio "$C_{Li}/(C_P+C_{E1}+C_{E2})$" on the surface of the composite particle may be measured by XPS in the manner described below. An XPS apparatus is prepared. For example, an XPS apparatus "PHI X-tool (trade name)" manufactured by ULVAC-PHI (or a similar product) may be used. A sample powder consisting of the composite particle is set into the XPS apparatus. With a pass energy of 224 eV, narrow scan analysis is carried out. The measurement data is processed with analysis software. For example, analysis software "MulTiPak (trade name)" manufactured by ULVAC-PHI (or a similar product) may be used. The peak area of Li1s spectrum (integral value) is converted to the element concentration of Li ($C_{Li}$). The peak area of $P_2p$ spectrum is converted to the element concentration of P ($C_P$). For E1 and E2, a suitable spectrum is selected depending on the type thereof. For example, for B, the peak area of B1s spectrum is converted to the element concentration of B ($C_{E1}$). For example, for La, the peak area of La3d5 spectrum is converted to the element concentration of La ($C_{E2}$). $C_{Li}$ is divided by the sum of $C_P$, $C_{E1}$, and $C_{E2}$ to give the particle surface Li composition ratio.

For example, when the coating film includes a plurality of types of E1, $C_{E1}$ represents the total element concentration of the plurality of types of E1. The same is true for E2 and $C_{E2}$.

The composition ratio "$C_{Li}/(C_P+C_{E1}+C_{E2})$" obtained by XPS reflects the Li composition ratio in the coating film (the phosphorus compound), but it is not equivalent to the Li composition ratio in the coating film. It is because XPS may also reflect the composition of the foundation (the active material particle). For example, due to Li in the foundation detected by XPS, the Li composition ratio by XPS can be higher than the Li composition ratio in the actual coating film.

The chemical composition of the phosphorus compound may be represented by, for example, the following formula (2).

$$Li_wE^1_xE^2_yPO_z \quad (2)$$

where $E^1$ represents E1, $E^2$ represents E2, and each of w, x, y, and z represents any number. Each of w, x, y, and z may be specified by, for example, analyzing the coating film portion of a cross section of the composite particle by STEM-EDX (Scanning Transmission Electron Microscope-Energy Dispersive X-ray Spectroscopy) and/or the like. The cross-section sample is prepared by the same procedure as described below (Film Thickness Measurement).

As a specific phosphorus compound, at least one selected from the group consisting of $Li_3PO_4$ (LPO), $BPO_4$ (BPO), and POx (such as $P_4O_6$, $P_2O_5$) may be used, for example.

In the composite particle, the covering rate of the surface of the active material particle with the coating film may be 70% or more, for example. When the covering rate is 70% or more, battery resistance is expected to be reduced. For example, the covering rate may be 85% or more, or may be 88% or more, or may be 89% or more, or may be 90% or more, or may be 94% or more, or may be 95% or more, or may be 97% or more. For example, the covering rate may be 100%, or may be 99% or less. For example, the covering rate may be from 85 to 97%, or may be from 90 to 97%.

(XPS Measurement of Covering Rate)

The covering rate is also measured by XPS. Measurement data, which is obtained in the same manner as in the above section "(XPS Measurement of Li Composition Ratio)" except that the pass energy is changed to 120 eV, is analyzed, and, from the peak area (the intensity value) of each of C1s, O1s, P1s, M2p3, Co2p3, and Ni2p3, the ratio of each element (the element concentration) is calculated. By the following expression (3), the covering rate is calculated.

$$\theta=(P+E1+E2)/(P+E1+E2+M)\times 100 \quad (3)$$

In the above expression (3), θ represents the covering rate (%). Each of P, E1, E2, and M represents the ratio of the corresponding element.

M in "M2p3" and in the above expression (3) represents a constituent element of the active material particle (a positive electrode active material particle) other than Li or O. That is, the active material particle (a positive electrode active material particle) may be represented by the following formula (4):

$$LiMO_2 \quad (4)$$

M may consist of one type of element, or may consist of a plurality of elements. M may be, for example, at least one selected from the group consisting of nickel (Ni), cobalt (Co), manganese (Mn), and aluminum (Al). When M includes a plurality of elements, the sum of the composition ratios of the elements may be 1.

For example, when the positive electrode active material particle is "$LiNi_{1/3}Co_{1/3}Mn_{1/3}O_2$", the above expression (3) may be changed into the following expression (3'):

$$\theta=(P+E1+E2)/(P+E1+E2+Ni+Co+Mn)\times 100 \quad (3')$$

In the above expression (3'), Ni represents the ratio of nickel element calculated from the peak area of Ni2p3, Co represents the ratio of cobalt element calculated from the peak area of Co2p3, and Mn represents the ratio of manganese element calculated from the peak area of Mn2p3.

The coating film may have a thickness from 5 to 100 nm, or may have a thickness from 5 to 50 nm, or may have a thickness from 10 to 30 nm, for example.

(Film Thickness Measurement)

Film thickness (the thickness of the coating film) may be measured by X-ray fluorescence analysis (XRF), from a calibration curve.

It should be noted that when the composite particle comprising the above-described phosphorus-based coating film that contains a phosphorus compound and has a low resistance is used in an electrode (such as a positive electrode, for example) and in a battery, high-voltage endurance and high power output are expected to be obtained.

<<Active Material Particle>>

The active material particle is the core of the composite particle. The active material particle may be a secondary particle (a group of primary particles). The active material particle (secondary particle) may have a D50 from 1 to 50 μm, or may have a D50 from 1 to 20 μm, or may have a D50 from 5 to 15 μm, for example. The primary particles may have a maximum Feret diameter from 0.1 to 3 μm, for example.

The active material particle may include any component. The active material particle may be either a positive electrode active material particle or a negative electrode active material particle.

The positive electrode active material particle may include, for example, at least one selected from the group consisting of $LiCoO_2$, $LiNiO_2$, $LiMnO_2$, $LiMn_2O_4$, $Li(NiCoMn)O_2$, $Li(NiCOAl)O_2$, and $LiFePO_4$. "(NiCoMn)" in "$Li(NiCoMn)O_2$", for example, means that the constituents within the parentheses are collectively regarded as a single unit in the entire composition ratio. As long as (NiCoMn) is collectively regarded as a single unit in the entire composition ratio, the amounts of individual constituents are not particularly limited. For example, $Li(NiCoMn)O_2$ may include $Li(Ni_{1/3}Co_{1/3}Mn_{1/3})O_2$, $Li(Ni_{0.5}Co_{0.2}Mn_{0.3})O_2$, $Li(Ni_{0.8}Co_{0.1}Mn_{0.1})O_2$, and/or the like. The positive electrode active material particle may be either a Hi-Nickel (a positive electrode active material with a high Ni ratio) or a ternary positive electrode active material.

<All-Solid-State Battery>

FIG. 1 is a conceptual view of an all-solid-state battery according to the present embodiment. An all-solid-state battery 100 may include an exterior package (not illustrated), for example. The exterior package may be a pouch made of metal foil laminated film and/or the like, for example. The exterior package may accommodate a power generation element 50. Power generation element 50 includes a positive electrode 10, a separator layer 30, and a negative electrode 20. That is, all-solid-state battery 100 includes positive electrode 10, separator layer 30, and negative electrode 20.

<<Positive Electrode>>

Positive electrode 10 is of layered form. For example, positive electrode 10 may include a positive electrode active material layer and a positive electrode current collector. For example, a positive electrode composite material may be applied to the surface of the positive electrode current collector to form the positive electrode active material layer. For example, the positive electrode current collector may include Al foil and/or the like. For example, the positive electrode current collector may have a thickness from 5 to 50 μm.

The positive electrode active material layer may have a thickness from 10 to 200 μm, for example. The positive electrode active material layer is closely adhered to separator layer 30. The positive electrode active material layer includes a positive electrode composite material. The positive electrode composite material includes a composite particle (a covered positive electrode active material) and a sulfide-based solid electrolyte. That is, positive electrode 10 includes a composite particle and a sulfide-based solid electrolyte. The details of the composite particle and the sulfide-based solid electrolyte are as described above.

The positive electrode active material layer may further include a conductive material, for example. The conductive material may form an electron conduction path inside the positive electrode active material layer. The amount of the conductive material to be used may be, for example, from 0.1 to 10 parts by mass relative to 100 parts by mass of the composite particle (the positive electrode active material). The conductive material may include any component. The conductive material may include, for example, at least one selected from the group consisting of carbon black, vapor grown carbon fiber (VGCF), carbon nanotube (CNT), and graphene flake.

The positive electrode active material layer may further include a binder, for example. The amount of the binder to be used may be, for example, from 0.1 to 10 parts by mass relative to 100 parts by mass of the composite particle (the positive electrode active material). The binder may include any component. The binder may include, for example, at least one selected from the group consisting of polyvinylidene difluoride (PVdF), vinylidene difluoride-hexafluoropropylene copolymer (PVdF-HFP), styrene-butadiene rubber (SBR), and polytetrafluoroethylene (PTFE).

<<Negative Electrode>>

Negative electrode 20 is of layered form. For example, negative electrode 20 may include a negative electrode active material layer and a negative electrode current collector. For example, a negative electrode composite material may be applied to the surface of the negative electrode current collector to form the negative electrode active material layer. For example, the negative electrode current collector may include Cu foil, Ni foil, and/or the like. For example, the negative electrode current collector may have a thickness from 5 to 50 μm.

The negative electrode active material layer may have a thickness from 10 to 200 μm, for example. The negative electrode active material layer is closely adhered to separator layer 30. The negative electrode active material layer includes a negative electrode composite material. The negative electrode composite material includes a negative electrode active material particle and a sulfide-based solid electrolyte. The negative electrode composite material may further include a conductive material and a binder. The negative electrode composite material and the positive electrode composite material may include the same type of, or different types of, sulfide-based solid electrolyte. The negative electrode active material particle may include any component. The negative electrode active material particle may include, for example, at least one selected from the group consisting of graphite, Si, $SiO_x$ ($0<x<2$), and $Li_4Ti_5O_{12}$.

<<Separator Layer>>

Separator layer 30 is interposed between positive electrode 10 and negative electrode 20. Separator layer 30 separates positive electrode 10 from negative electrode 20. Separator layer 30 includes a sulfide-based solid electrolyte. Separator layer 30 may further include a binder. Separator layer 30 and the positive electrode composite material may include the same type of, or different types of, sulfide-based solid electrolyte. Separator layer 30 and the negative electrode composite material may include the same type of, or different types of, sulfide-based solid electrolyte.

<Method of Producing Composite Particle>

Figure 2:
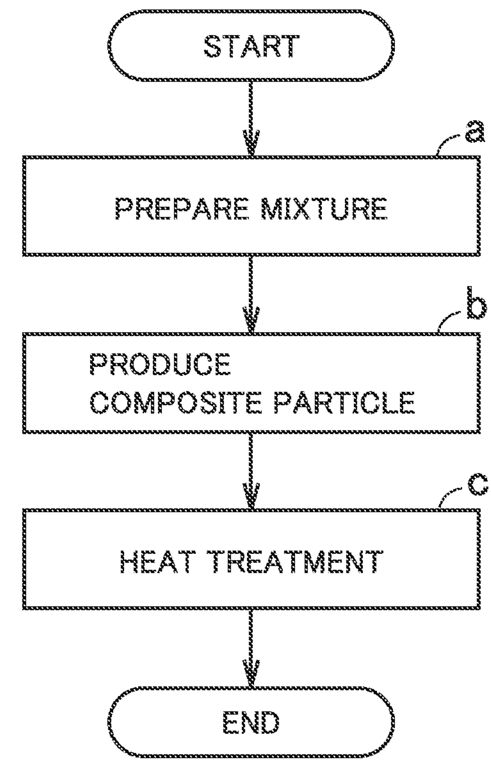
FIG. 2 is a schematic flowchart illustrating a method of producing a composite particle according to the present embodiment.

FIG. 2 is a schematic flowchart illustrating a method of producing a composite particle according to the present embodiment. Hereinafter, "the method of producing a composite particle according to the present embodiment" may also be simply called "the present production method". The present production method includes "(a) Preparing a mixture" and "(b) Producing a composite particle". The present production method may further include "(c) Heat treatment" and/or the like, for example.

<<(a) Preparing Mixture>>

The present production method includes preparing a mixture by mixing a coating liquid and a positive electrode active material particle (allowing the coating liquid to adhere to the surface of the positive electrode active material particle). The details of the positive electrode active material particle are as described above.

For example, the mixture may be either a suspension or a wet powder, as long as the coating liquid is adhered to the surface of the positive electrode active material particle in the mixture. For example, the suspension may be formed by dispersing the positive electrode active material particle (powder) in the coating liquid. For example, the wet powder may be formed by spraying the coating liquid into the positive electrode active material particle powder. In the present production method, any mixing apparatus and/or any granulating apparatus may be used, for example.

The coating liquid includes a solute (including a solute and a dispersoid) and a solvent (a solvent and a dispersion medium, or a solvent). The solute includes, as a material of the coating film, at least one of a first element (E1) and a second element (E2) as well as phosphorus (P). The coating liquid may further include suspended matter (an insoluble component), sediment, and/or the like, for example.

For example, the total amount of the solute may be from 0.1 to 20 parts by mass, or may be from 1 to 15 parts by mass, or may be from 5 to 10 parts by mass, relative to 100 parts by mass of the solvent.

The solvent may include any component as long as it can dissolve the solute. The solvent may include water, alcohol, and/or the like, for example. The solvent may include ion-exchanged water and/or the like, for example.

The details of E1 and E2 are as described above.

The solute may include, for example, at least one selected from the group consisting of an oxoacid of E1 and an oxide of E1. The solute may include, for example, at least one selected from the group consisting of boric acid, silicic acid, nitric acid, sulfuric acid, and germanic acid. The solute may include orthoboric acid, metaboric acid, and/or the like, for example.

The solute may include an oxide of E2, for example. The solute may include, for example, at least one selected from the group consisting of lanthanum oxide, cerium oxide, and yttrium oxide.

The solute may include a phosphoric acid compound, for example. Thus, the solute may include P. The phosphoric acid compound may be, for example, at least one selected from the group consisting of anhydrous phosphoric acid ($P_2O_5$), orthophosphoric acid, pyrophosphoric acid, metaphosphoric acid [$(HPO_3)_n$], and polyphosphoric acid. The phosphoric acid compound may be, for example, at least one selected from the group consisting of metaphosphoric acid and polyphosphoric acid. Metaphosphoric acid and polyphosphoric acid may have a longer molecular chain than other phosphoric acid compounds. When the phosphoric acid compound has a long molecular chain, a continuous coating film is likely to be formed. When the coating film is continuous, the covering rate is expected to be increased, for example.

In the coating liquid described above, a relationship of the following expression (5) may be satisfied, for example:

$$0.040<(n_{E1}+n_{E2})/n_P\leq 1.51 \qquad (5)$$

where $n_P$ represents the molarity of P in the coating liquid, $n_{E1}$ represents the molarity of the first element in the coating liquid, and $n_{E2}$ represents the molarity of the second element in the coating liquid.

"$(n_{E1}+n_{E2})/n_P$" represents the molar ratio (the ratio of the amount of substance) of the sum of the first element (E1) and the second element (E2) to P in the coating liquid. When this molar ratio is more than 0.040 and not more than 1.51, battery resistance is expected to be reduced.

For example, the molar ratio described above may be 1.03 or less, or may be 0.67 or less, or may be 0.48 or less, or may be 0.098 or less, or may be 0.051 or less. For example, this molar ratio may be 0.048 or more, or may be 0.10 or more. For example, this molar ratio may be from 0.048 to 1.03.

(ICP Measurement)

The molar ratio described above "$(n_{E1}+n_{E2})/n_P$" in the coating liquid is measured by the procedure described below. The coating liquid in an amount of 0.01 g is diluted with deionized water, and thereby 100 mL of a sample liquid is prepared. Aqueous solutions of P, E1, and E2 (1000 ppm, 10000 ppm) are prepared. Each aqueous solution in an amount of 0.01 g is diluted with deionized water, and thereby a reference liquid is prepared. An ICP-AES (Inductively Coupled Plasma Atomic Emission Spectroscopy) apparatus is prepared. With the ICP-AES apparatus, the emission intensity of the reference liquid is measured. From the emission intensity of the reference liquid, a calibration curve is created. With the ICP-AES apparatus, the emission intensity of the sample liquid (the diluted coating liquid) is measured. From the emission intensity of the sample liquid and the calibration curve, the mass concentration of each of P, E1, and E2 in the coating liquid is calculated. Further, the mass concentration of each of P, E1, and E2 is converted to molarity. The sum of the molarity of E1 ($n_{E1}$) and the molarity of E2 ($n_{E2}$) is divided by the molarity of P ($n_P$), and thereby the molar ratio is calculated.

The solute may further include Li, and, for example, it may further include a lithium compound. The lithium compound may be lithium hydroxide, lithium carbonate, lithium nitrate, and/or the like, for example.

The molar ratio of Li to the sum of P, E1, and E2, "$n_{Li}/(n_P+n_{E1}+n_{E2})$", may be less than 1.1, or may be 1.0 or less, or may be 0.45 or less, or may be 0.1 or less, or may be 0.05 or less, for example. The molar ratio "$n_{Li}/(n_P+n_{E1}+n_{E2})$" may be zero, for example. That is, the solute may not include Li. $n_{Li}$ may be below the identification limit in the ICP measurement. The smaller the molar ratio "$n_{Li}/(n_P+n_{E1}+n_{E2})$" is, the more decreased the Li composition ratio on the particle surface is expected to be.

<<(b) Producing Composite Particle>>

The present production method includes producing a composite particle by drying the mixture described above. The coating liquid adhered to the surface of the active material particle is dried, thereby a coating film is produced, and thus a composite particle is produced. In the present production method, any drying method may be employed.

When the mixture is a suspension including the active material particle and the coating liquid, for example, spray drying may be employed to form the composite particle. More specifically, a suspension including the active material particle and the coating liquid may be sprayed from a nozzle, then the sprayed droplets may be dried by the use of hot air and/or the like, and thereby the composite particle may be formed. The use of spray drying is expected to increase the covering rate, for example.

The solid content (volume fraction) of the suspension for use in the spray drying may be from 1 to 50%, or may be from 10 to 30%, for example. The diameter of the nozzle may be from 0.1 to 10 mm, or may be from 0.1 to 1 mm, for example. The temperature of the hot air may be from 100 to 200° C., for example.

For example, a tumbling fluidized-bed coating apparatus may be used to produce the composite particle. Such a tumbling fluidized-bed coating apparatus is capable of carrying out "(a) Preparing a mixture" (making the coating liquid adhere to the surface of the active material particle) and "(b) Producing a composite particle" at the same time.

<<(c) Heat Treatment>>

The present production method may include subjecting the composite particle to heat treatment. The heat treatment allows the coating film to be fixed. The heat treatment may also be called "calcination". In the present production method, any heat treatment apparatus may be used. The temperature of the heat treatment may be from 150 to 300° C., for example. The duration of the heat treatment may be from 1 to 10 hours, for example. The heat treatment may be carried out in the air, or the heat treatment may be carried out in an inert atmosphere, for example.

EXAMPLES

Example 1

[Preparing Composite Particle]

Metaphosphoric acid (manufactured by FUJIFILM Wako Pure Chemical Corporation) in an amount of 10.8 g was dissolved in 166.0 g of ion-exchanged water to give a phosphoric acid aqueous solution. To the resulting phosphoric acid aqueous solution, lithium hydroxide monohydrate was added and dissolved, and thereby a coating liquid was prepared. The amount of lithium hydroxide monohydrate to be used was adjusted so that the molar ratio of Li to P in the coating liquid ($C_{Li}/C_P$) became 0.75.

As a positive electrode active material particle, $Li(Ni_{1/3}Co_{1/3}Mn_{1/3})O_2$ was prepared. The positive electrode active material particle in an amount of 50 parts by mass was dispersed in 53.7 parts by mass of the coating liquid, and thereby a suspension was prepared. The resulting suspension was spray-dried, and thereby a composite particle powder was prepared.

The resulting composite particle was subjected to heat treatment in an air atmosphere. The temperature of the heat treatment was 200° C. The duration of the heat treatment was 5 hours. In this manner, a composite particle (a covered positive electrode active material) of Example 1 having a coating film of a thickness of 20 nm was obtained. It is considered that, in the composite particle of Example 1, the coating film includes a phosphorus compound $Li_3PO_4$ (LPO).

[Producing All-Solid-State Battery]

(Producing Positive Electrode)

The below materials were prepared.

Sulfide-based solid electrolyte: Highly crystalline ceramic SE ($LiCl—LiBr—Li_3PS_4$ calcined at a temperature of 300° C. or more, with a D50 of 0.8 μm)

Conductive material: VGCF (vapor grown carbon fibers)

Binder: SBR (butadiene rubber)

Dispersion medium: Heptane

Positive electrode current collector: Al foil

The composite particle described above, the sulfide-based solid electrolyte, the conductive material, the binder, and the dispersion medium were mixed, and thereby a positive electrode slurry was prepared. The mixing ratio between the composite particle and the sulfide-based solid electrolyte was "(composite particle)/(sulfide-based solid electrolyte) =7/3 (volume ratio)". The amount of the conductive material to be used was 3 parts by mass relative to 100 parts by mass of the composite particle. The amount of the binder to be used was 0.7 parts by mass relative to 100 parts by mass of the composite particle. With the use of an ultrasonic homogenizer (manufactured by SMT, UH-50), the positive electrode slurry was stirred sufficiently. The positive electrode slurry was applied to the surface of the positive electrode current collector, and thereby coating was formed. With the use of a hot plate, the resulting coating was dried at 100° C. for 30 minutes. Thus, a positive electrode raw sheet was produced. From the resulting positive electrode raw sheet, a disk-like positive electrode was cut out. The positive electrode had an area of 1 $cm^2$.

(Producing Negative Electrode)

Into a kneading vessel of a filmix apparatus (model 30-L, manufactured by PRIMIX), a sulfide-based solid electrolyte ($Li_2S—P_2S_5$-type glass ceramic including LiI, with a D50 of 0.8 μm), 1 mass % of a conductive aid (VGCF), 2 mass % of a binder (SBR), and heptane were added, followed by stirring at 20000 rpm for 30 minutes.

Then, a negative electrode active material ($Li_4Ti_5O_{12}$ particles, with a D50 of 1 μm) and a solid electrolyte in a volume ratio of 6:4 were added to the kneading vessel, followed by stirring with the filmix apparatus at 15000 rpm for 60 minutes, and thereby a negative electrode composite material was prepared. The resulting negative electrode composite material was applied to a copper foil, followed by drying at 100° C. for 30 minutes. Thus, a negative electrode raw sheet was produced. From the resulting negative electrode raw sheet, a disk-like negative electrode was cut out. The negative electrode had an area of 1 $cm^2$.

(Producing Separator Layer)

In a ceramic cylinder having an inner diameter cross-sectional area of 1 $cm^2$, 64.8 mg of a sulfide-based solid electrolyte ($Li_2S—P_2S_5$-type glass ceramic including LiI, with a D50 of 2.5 μm) was placed, made even, and then pressed at 1 ton/$cm^2$, and thereby a separator layer (a solid electrolyte layer) was formed.

(Producing Battery)

One side of the solid electrolyte layer was overlaid with the above-produced positive electrode, and the other side of the solid electrolyte layer was overlaid with the above-produced negative electrode, followed by pressing at 6 ton/cm$^2$ for 1 minute. Then, with a terminal (a stainless steel rod) inserted in the positive electrode and the negative electrode, restraining was performed at 1 ton, and thereby an all-solid-state battery (an all-solid-state lithium-ion battery) was produced.

Example 2

In Example 2, as a sulfide-based solid electrolyte for positive electrode production, a highly crystalline glass ceramic SE (LiI—LiBr—$Li_2S$—$P_2S_5$ calcined at a temperature of 180° C. or less, with a D50 of 0.8 μm) was used. Except this, in the same manner as in Example 1, a positive electrode and a battery of Example 2 were produced.

Example 3

In Example 3, boric acid (manufactured by Nacalai Tesque) was added to and dissolved in the same phosphoric acid aqueous solution as in Example 1 to prepare the coating liquid. The amount of boric acid to be used was adjusted so that the molar ratio of B to P ($C_B/C_P$) became 1.0. Except these, in the same manner as in Example 1, a positive electrode and a battery of Example 3 were produced. It is considered that, in the composite particle of Example 3, the coating film includes a phosphorus compound $BPO_4$ (BPO).

Example 4

In Example 4, as a sulfide-based solid electrolyte for positive electrode production, a highly crystalline glass ceramic SE (LiI—LiBr—$Li_2S$—$P_2S_5$ calcined at a temperature of 180° C. or less, with a D50 of 0.8 μm) was used. Except this, in the same manner as in Example 3, a positive electrode and a battery of Example 4 were produced.

<Evaluation>

Each of the batteries (all-solid-state batteries) of Examples described above were evaluated by the method described below.

(Checking Initial Capacity)

For each battery, three cycles of constant current-constant voltage (CC-CV) charging and constant-current (CC) discharging were carried out at ⅓ C-rate. The discharged capacity at the third cycle was checked, which was regarded as the initial capacity. "C" is the unit of current rate. "1 C" refers to a current rate at which SOC (State of Charge) increases from 0% to reach 100% in one hour of charging.

[Measurement of Initial DCIR]

Each battery whose initial capacity was checked in the above manner was charged to an SOC (State of Charge) of 40% by constant current-constant voltage charging under the conditions below.

Constant-current charging: Current value of ⅓ C, charge cut-off voltage of 4.05 V Constant-voltage charging: Voltage value of 4.05 V, current value of 20 A Subsequently, the battery was placed in an atmosphere of 25° C. and discharged at a current value of 3 C for 2 seconds, and, 2 seconds after the start of discharging, the voltage value was measured. From the relationship between the amount of voltage drop and the current during discharging, a direct current internal resistance (DCIR) was calculated. Table 1 shows the results of DCIR (initial DCIR) measurement.

[Measurement of DCIR after Endurance Testing]

Each battery whose initial DCIR was measured in the above manner was subjected to an endurance test (a charge-discharge cycle test). Specifically, a charge-discharge cycle (a single sequence of CC charging and CC discharging) was repeated 150 times under the cycle conditions described below.

(Cycle Conditions)

Ambient temperature: 60° C.

CC charging: current=5 C, cut-off voltage=2.5 V (SOC upper limit=80%)

CC discharging: current=1 C, cut-off voltage=1.5 V

For each battery after the endurance test, DCIR was measured in the same manner as in the above-described measurement of initial DCIR. Table 1 shows the increment of DCIR after endurance testing, relative to initial DCIR.

TABLE 1

| | Phosphorus compound in coating film | Solid electrolyte (SE) | Initial DCIR [Ω] | DCIR increment after endurance testing [%] |
|---|---|---|---|---|
| Example 1 | LPO | Ceramic SE | 18 | 32.9 |
| Example 2 | LPO | Glass ceramic SE | 16.5 | 82.8 |
| Example 3 | BPO | Ceramic SE | 11 | 18 |
| Example 4 | BPO | Glass ceramic SE | 13 | 42 |

Referring to the results shown in Table 1, in Examples 1 to 4 where a highly crystalline (with a molar ratio of the $PS_4$ crystalline phase of 60% or more) sulfide-based solid electrolyte (ceramic SE or glass ceramic SE) was used, the increment of battery resistance after endurance testing was a relatively low value.

In Examples 1 and 3 where a sulfide-based solid electrolyte (ceramic SE) with a molar ratio of the $PS_4$ crystalline phase of 70% or more was used, the increment of battery resistance after endurance testing was lower than in Examples 2 and 4 where glass ceramic SE was used.

<$^{31}$P MAS-NMR Measurement>

As for each of the ceramic SE used in Examples 1 and 3 and the glass ceramic SE used in Examples 2 and 4 as described above, solid $^{31}$P MAS-NMR spectrum was measured with the use of AVANCE III 600 (manufactured by Bruker) under the measurement conditions described below.

(Measurement Conditions)

Observation frequency (resonance frequency): 242.94 MHz

Observation width: 250 kHz

Measurement method: Single pulse method

Flip angle: 90° pulse

Repetition relaxation delay (relaxation delay after measurement): 5 times longer than $T_1$ ($^{31}$P relaxation time) or even longer Probe: 4.0 mm MAS spinning rate (number of spinning): 15 kHz Chemical shift reference material: 85% phosphoric acid aqueous solution (0 ppm)

From the spectra obtained by the measurement described above, the molar ratios of $PS_4$ crystalline phase, $PS_4$ amorphous phase, and $P_2S_6$ phase were determined.

TABLE 2

| | $PS_4$ crystalline phase (high ion conductive phase) | | $PS_4$ amorphous phase (low ion conductive phase) | | $P_2S_6$ phase (low ion conductive phase) |
|---|---|---|---|---|---|
| Chemical shift value | 78 ppm ($PS_4$ 2b) | 92 ppm ($PS_4$ 4d) | 85 ppm | 88 ppm | 106 ppm |
| Glass ceramic SE | 25.4% | 36.2% | — | 31.7% | 6.2% |
| | 61.6% | | 32% | | 6.2% |
| Ceramic SE | 83.7 ppm | | — | | — |
| | 100% | | 0% | | 0% |

Referring to the results shown in Table 2, it was found that the ceramic SE used in Examples 1 and 3 had a molar ratio of the $PS_4$ crystalline phase (a degree of crystallinity) of 100%, did not include a $PS_4$ amorphous phase or a $P_2S_6$ phase, and had a high crystallinity.

In contrast, the glass ceramic SE used in Examples 2 and 4 had a molar ratio of the $PS_4$ crystalline phase of 61.6% and included a $PS_4$ amorphous phase and a $P_2S_6$ phase. However, this glass ceramic SE also had a molar ratio of the $PS_4$ crystalline phase of 60% or more and therefore can be used as a sulfide-based solid electrolyte in the present disclosure.

Although the embodiments of the present disclosure have been described, the embodiments disclosed herein are illustrative and non-restrictive in any respect. The scope of the present disclosure is defined by the terms of the claims, and is intended to encompass any modifications within the meaning and the scope equivalent to the terms of the claims.

What is claimed is:

1. An electrode comprising:

a sulfide-based solid electrolyte; and a composite particle, wherein the sulfide-based solid electrolyte includes S and P, has a $PS_4$ crystalline phase, and has a molar ratio of the $PS_4$ crystalline phase to a total amount of phases consisting of P and S of 60% or more, the composite particle comprises an active material particle and a coating film covering at least part of a surface of the active material particle, the coating film includes a phosphorus compound, the phosphorus compound includes a first element and phosphorus, and optionally a second element, where:

the first element, is at least one selected from the group consisting of boron, silicon, and germanium, and the second element is a transition element, and in the coating film, a relationship of the following expression (1) is satisfied:

$$C_{Li}/(C_P+C_{E1}+C_{E2})\leq 2.5 \quad (1)$$

where;

each of $C_{Li}$, $C_P$, $C_{E1}$, and $C_{E2}$ represents an element concentration measured by X-ray photoelectron spectrometry, $C_{Li}$ represents an element concentration of lithium, $C_P$ represents an element concentration of phosphorus, $C_{E1}$ represents an element concentration of the first element, and $C_{E2}$ represents an element concentration of the second element.

2. The electrode according to claim 1, wherein the second element is at least one selected from the group consisting of a second transition element and a third transition element.

3. The electrode according to claim 1, wherein the sulfide-based solid electrolyte further includes Li.

4. The electrode according to claim 1, wherein the active material particle is a positive electrode active material particle, and the electrode is a positive electrode.

5. The electrode of claim 1, wherein the first element is boron.

6. An all-solid-state battery comprising the electrode according to claim 1.

* * * * *